（12）United States Patent
Chang et al.

(10) Patent No.: US 8,993,167 B2
(45) Date of Patent: Mar. 31, 2015

(54) CATHODE MATERIALS AND LITHIUM SECONDARY BATTERY CONTAINING THE SAME

(75) Inventors: Sung kyun Chang, Daejeon (KR); Hong-Kyu Park, Daejeon (KR); Sinyoung Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/851,888

(22) Filed: Aug. 6, 2010

(65) Prior Publication Data

US 2011/0151328 A1 Jun. 23, 2011

Related U.S. Application Data (63) Continuation of application No. PCT/KR2010/000084, filed on Jan. 6, 2010.

(30) Foreign Application Priority Data

Jan. 6, 2009 (KR) .................. 10-2009-0000701

(51) Int. Cl.
*H01M 4/00* (2006.01)
*H01M 4/525* (2010.01)
*H01M 4/36* (2006.01)
*H01M 4/62* (2006.01)
H01M 10/0525 (2010.01)
H01M 4/02 (2006.01)

(52) U.S. Cl.
CPC .............. *H01M 4/525* (2013.01); *H01M 4/366* (2013.01); *H01M 4/62* (2013.01); *H01M 4/625* (2013.01);
(Continued)

(58) Field of Classification Search
CPC ........ H01M 4/366; H01M 4/525; H01M 4/62; H01M 4/625; H01M 10/0525; H01M 2004/028; Y02T 10/7011; Y02E 60/122

USPC .............. 429/223, 224, 231.4, 231.5, 231.8, 429/231.9, 231.95, 231, 218, 218.1, 231.1, 429/231.3, 231.6
See application file for complete search history.

(56) References Cited

U.S. PATENT DOCUMENTS 7,579,114 B2 * 8/2009 Ohzuku et al. .............. 429/231.1
2005/0227147 A1 * 10/2005 Kogetsu et al. ........... 429/231.95
(Continued)

FOREIGN PATENT DOCUMENTS

CN 1658414 A 8/2005
JP 2003-59491 A 2/2003
(Continued)

OTHER PUBLICATIONS

Maier (editor), "Solid State Ionics", First year published 1980, http://www.sciencedirect.com/science/journal/01672738 (2 pages provided).

*Primary Examiner* — Gary Harris
(74) *Attorney, Agent, or Firm* — Birch, Stewart, Kolasch & Birch, LLP (57) ABSTRACT

Provided is a cathode active material composed of lithium nickel oxide represented by Formula 1, wherein the lithium nickel oxide contains nickel in an amount of 40% or higher, based on the total weight of transition metals, and the cathode active material comprises a first coating layer provided on the surface thereof and a second coating layer provided on the surface of the first coating layer, wherein the first coating layer is composed of a non-reactive material selected from the group consisting of oxides, nitrides, sulfides and mixtures or complexes thereof and the second coating layer is composed of a carbon-based material.

6 Claims, 6 Drawing Sheets

(52) U.S. Cl.
CPC ..... *H01M 10/0525* (2013.01); *H01M 2004/028* (2013.01); *Y02E 60/122* (2013.01); *Y02T 10/7011* (2013.01)
USPC ..... 429/223; 429/218.1; 429/224; 429/231.6; 429/231.1; 429/231.3

(56) References Cited

U.S. PATENT DOCUMENTS

| | | |
|---|---|---|
| 2008/0063941 A1 | 3/2008 | Itaya et al. |
| 2008/0280141 A1* | 11/2008 | Dobbs et al. .................. 428/403 |
| 2009/0212267 A1* | 8/2009 | Dobbs et al. ................ 252/521.2 |
| 2009/0278082 A1 | 11/2009 | Takebayashi et al. |
| 2010/0112449 A1* | 5/2010 | Fujita et al. .................... 429/231 |
| 2010/0154206 A1* | 6/2010 | Mao et al. ..................... 29/623.5 |

FOREIGN PATENT DOCUMENTS

| | | | |
|---|---|---|---|
| KR | 10-2001-0091887 A | 10/2001 | |
| KR | 10-2005-0048453 A | 5/2005 | |
| KR | 10-2007-0008115 A | 1/2007 | |
| KR | 10-2007-0081831 A | 8/2007 | |
| WO | WO 2006/106913 A1 | 10/2006 | |
| WO | WO/2008/120442 * | 10/2008 | ............. H01M 4/36 |

* cited by examiner

CATHODE MATERIALS AND LITHIUM SECONDARY BATTERY CONTAINING THE SAME

CROSS REFERENCE TO RELATED APPLICATIONS

This application is a Continuation of PCT International Application No. PCT/KR2010/000084 filed on Jan. 6, 2010, which claims the benefit of Patent Application No. 10-2009-0000701 filed in Republic of Korea, on Jan. 6, 2009. The entire contents of all of the above applications is hereby incorporated by reference into the present application.

TECHNICAL FIELD

The present invention relates to a cathode active material and a lithium secondary battery comprising the same. More specifically, the present invention relates to a cathode active material and a lithium secondary battery comprising the same, wherein a cathode active material composed of lithium nickel oxide represented by Formula 1, wherein the lithium nickel oxide contains nickel in an amount of 40% or higher, based on the total weight of transition metals, and the cathode active material comprises a first coating layer provided on the surface thereof and a second coating layer provided on the surface of the first coating layer, wherein the first coating layer is composed of a non-reactive material selected from the group consisting of oxides, nitrides, sulfides and mixtures or complexes thereof and the second coating layer is composed of a carbon-based material.

BACKGROUND ART

Technological development and increased demand for mobile equipment have led to a rapid increase in the demand for secondary batteries as energy sources. In particular, increased interest in environmental issues has brought about a great deal of research associated with electric vehicles, hybrid electric vehicles and plug-in hybrid electric vehicles which serve as alternatives to vehicles using fossil fuels such as gasoline vehicles and diesel vehicles. These electric vehicles generally use nickel-metal hydride secondary batteries as power sources. However, a great deal of study associated with use of lithium secondary batteries with high energy density and discharge voltage is currently underway and some of them are commercially available.

Such lithium secondary batteries mainly use carbon-based materials as anode active materials and use of lithium metals and sulfur compounds as anode active materials has been considered. Meanwhile, the lithium secondary batteries generally use lithium cobalt composite oxide ($LiCoO_2$) as an anode active material. Also, lithium manganese composite oxides such as $LiMnO_2$ having a layered crystal structure and $LiMn_2O_4$ having a spinel crystal structure and lithium nickel composite oxide ($LiNiO_2$) as cathode active materials have been considered.

Lithium nickel oxides such as $LiNiO_2$ are cheaper than the cobalt oxides and exhibit higher discharge capacity when charged to 4.3V. Accordingly, in spite of slightly low average discharge voltage and volumetric density, commercial batteries comprising lithium nickel oxides have improved energy density and a great deal of research on these nickel-based cathode active materials is thus actively conducted in order to develop high-capacity batteries. However, nickel-based cathode active materials have problems of rapid phase transition of crystal structures according to volume variations involved in charge/discharge cycles, rapid deterioration in chemical resistance on the surface thereof exposed to air and humidity and generation of excess gases during storage or cycles. For this reason, nickel-based cathode active materials wherein other transition metals such as manganese or cobalt partially substitute for nickel have been developed. These metal-substituted lithium transition metal compounds advantageously exhibit superior cycle and capacity characteristics.

However, lithium transition metal oxides useful as cathode active materials have disadvantages of low electrical conductivity and insufficient charge/discharge rate characteristics due to low ionic conduction resulting from use of non-aqueous electrolytes.

In order to solve these problems, conventional technologies suggest coating or treating the surface of a cathode active material with a predetermined material. For example, reduction of contact interface resistance between a cathode active material and an electrolyte or by-products formed at a high temperature by coating the cathode active material with a conductive material such as a conductive polymer is well known in the art. However, cathode active materials exerting sufficient battery characteristics have not been developed yet.

Furthermore, high energy density entails the possibility of exposure to extreme risk. Accordingly, as energy density increases, the risk of combustion and explosion disadvantageously increases.

In this regard, a great deal of research according to various approaches is underway, but satisfactory results have not been obtained to date. Improvement in energy density according to increasing complexity and multi-functionalization of mobile equipment has brought about an increase in safety-related problems and there is a need for further improvement in rate characteristics of lithium secondary batteries due to the requirements of electric vehicles, hybrid electric vehicles and power tools.

However, safety and rate characteristics conflict with each other and it is considerably difficult to simultaneously improve these properties and research thereof has not been performed.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present invention have discovered that in the case where a first coating layer as a non-reactive material and a second coating layer as a carbon-based material are sequentially formed on the surface of lithium nickel oxide, high-temperature stability can be improved without deteriorating electrical conductivity and ionic conductivity, and superior rate characteristics can be thus achieved. The present invention has been completed based on this discovery.

Technical Solution

In accordance with one aspect of the present invention, provided is a cathode active material composed of lithium nickel oxide represented by the following Formula 1, wherein the lithium nickel oxide contains nickel in an amount of 40% or higher, based on the total weight of transition metals, and the cathode active material comprises a first coating layer provided on the surface thereof and a second coating layer provided on the surface of the first coating layer, wherein the first coating layer is composed of a non-reactive material selected from the group consisting of oxides, nitrides, sulfides and mixtures or complexes thereof, and the second coating layer is composed of a carbon-based material:

$$Li_xNi_yM_{1-y}O_2 \quad (1)$$

wherein $0.95 \leq x \leq 1.15$, $0.4 \leq y \leq 0.9$ and M is at least one selected from the group consisting of elements having stable hexacoordination structures, such as Mn, Co, Mg and Al.

The lithium nickel oxide according to the present invention has a bi-layer structure in which a non-reactive material selected from the group consisting of oxides, nitrides, sulfides and mixtures or complexes thereof and a carbon-based material are sequentially coated on the surface of the lithium nickel oxide, thus advantageously exerting superior rate characteristics and maintaining stability at high temperatures due to electrical conductivity and ionic conductivity.

Specifically, the first coating layer composed of the non-reactive material forms the interface between an electrolyte solution and the cathode active material, thus minimizing contact between the surface of the lithium nickel oxide and the electrolyte solution. Accordingly, the cathode active material prevents rapid heat-generation together with emission of a large amount of oxygen, caused by exposure to the electrolyte solution due to abnormal high-temperature states or external impact, and thus improves high-temperature stability. Furthermore, the second coating layer composed of a carbon-based material does not cause deterioration in electrical conductivity and ionic conductivity and thus exerts superior rate characteristics.

Furthermore, for the cathode active material according to the present invention, the non-reactive material and the carbon-based material are sequentially coated on the surface of lithium nickel oxide, synergistic effects can be exerted due to interaction therebetween, battery performance and high-temperature stability are considerably improved, as compared to cathode active materials comprising exclusively either the non-reactive material or the carbon-based material.

The lithium nickel oxide is a cathode active material containing nickel in an amount of 40% or higher, based on the total weight of transition metals. When nickel is present in an excessive amount, as compared to other transition metals, the ratio of divalent nickel increases. In this case, the amount of electric charges capable of moving lithium ions increases and high capacity can thus be advantageously exerted.

The composition of lithium nickel oxide should satisfy a specific condition defined by Formula 1 below:

$$Li_xNi_yM_{1-y}O_2 \quad (1)$$

wherein $0.95 \leq x \leq 1.15$, $0.4 \leq y \leq 0.9$, and M is at least one selected from the group consisting of elements having stable hexacoordination structures, such as Mn, Co, Mg and Al.

That is, the lithium content (x) is 0.95 to 1.05. When the amount of lithium is higher than 1.05, in particular, stability may be disadvantageously deteriorated during cycles at a high voltage (U=4.35V) at T=60° C. On the other hand, in the case of x<0.95, rate characteristics are low and reversible capacity may decrease.

In addition, the content (y) of nickel (Ni) is higher than those of manganese and cobalt, which is 0.4 to 0.9. When the content (y) of nickel is less than 0.4, high capacity cannot be realized, and on the other hand, when the content of nickel exceeds 0.9, stability may be considerably decreased.

M may be at least one selected from the group consisting of elements having stable hexacoordination structures, such as Mn, Co, Mg and Al. Preferably, M is Mn or Co.

In a preferred embodiment, the lithium nickel oxide represented by Formula 1 may be lithium nickel-manganese-cobalt oxide represented by Formula (1a) below:

$$Li_xNi_yMn_cCo_dO_2 \quad (1a)$$

wherein $c+d=1-y$ in which $0.05 \leq c \leq 0.4$, $0.1 \leq d \leq 0.4$.

When the content (c) of manganese is lower than 0.05, stability is deteriorated, and when the content (c) is higher than 0.4, the amount of electric charges capable of moving decreases and capacity decreases.

In addition, the content (d) of cobalt is 0.1 to 0.4. When b>0.4 and the content of cobalt is excessively high, the cost of raw materials increases and $Co^{4+}$ is unstable upon charge, thus disadvantageously decreasing stability. On the other hand, when the content of cobalt is excessively low (b<0.1), it is difficult to obtain both sufficient rate characteristics and high powder density.

For such lithium nickel oxide, as the amount of Ni increases, the content of $Ni^{2+}$ increases during sintering and deintercalation of oxygen becomes serious at high temperatures. These behaviors cause disadvantages including low stability of crystalline structures, large specific area, high impurity content, high reactivity with electrolyte solution and low high-temperature stability.

Accordingly, by applying the non-reactive material to the surface of the cathode active material of Formula 1, the surface of the cathode active material and reactivity with the electrolyte solution can be minimized and high-temperature stability can thus be improved.

In the case where an insulating material is generally applied to the surface of the cathode active material in order to improve high-temperature stability, when the insulating material is used in a small amount, it does not have a satisfactory effect on stability, and on the other hand, when the insulating material is used in a large amount, it affects ionic passage stability, thus causing deterioration in electrochemical performance. In addition, since the insulating material is electrically insulating, an electrical passage may be shortened and battery performance may thus be deteriorated.

Accordingly, by further forming the second coating layer composed of a carbon-based material having superior conductivity on the first coating layer composed of a non-reactive material of the present invention, mobility of ions and electrons is improved to compensate conductivity.

When the particle size of lithium nickel oxide increases, stability of crystal particles is improved, thus enabling easy fabrication of batteries comprising the crystal particles and improving the efficiency of the fabrication process. However, when the particle size of the cathode active material is excessively large, the surface area of the cathode active material reacted with the electrolyte solution in battery cells decreases and problems of considerable deterioration in high-voltage storage characteristics or rate characteristics thus occur. On the other hand, when the particle size of lithium nickel oxide is excessively small, structural stability such as high-temperature characteristics may be disadvantageously deteriorated. In view of these factors, the average diameter (D50) of the lithium nickel oxide is preferably 3 to 20 μm. That is, structural stability such as high-temperature characteristics is superior and side reactions such as dissociation of the electrolyte solution may thus decrease.

In a preferred embodiment, the lithium nickel oxide may have a secondary particle which is in the form of an aggregate of primary particles. In this case, the primary particle has an average diameter of 0.01 to 8 μm and the secondary particle has an average diameter of 3 to 20 μm.

As the particle size of the primary particles becomes smaller, rate characteristics improve, and on the other hand, if the particle size is excessively small, it is disadvantageous in that specific surface area of the primary particles becomes larger, the amount of impurities provided on the surface increases due to inherent properties of lithium nickel oxide and the secondary particles in the form of an aggregate of the primary particles may be deformed by pressure applied during cathode fabrication. When the diameter of primary particles becomes larger, the amount of impurities may decrease and the secondary particles can efficiently maintain their structures. On the other hand, when the particle size is excessively large, rate characteristics may be disadvantageously deteriorated.

Meanwhile, as the secondary particles become smaller, lithium ions can more efficiently move and rate characteristics are thus superior, and on the other hand, when the particle size is excessively small upon cathode fabrication, problems such as coagulation of the particles, deterioration in dispersibility, increase in amount of binder used and decrease in battery capacity occur.

The non-reactive material constituting the first coating layer refers to a material which does not react with an electrolyte solution and is selected from oxides, nitrides, sulfides and mixtures or complexes thereof.

Specifically, examples of useful non-reactive materials include oxides such as aluminum oxide, magnesium oxide or zirconium oxide, fluorides such as aluminum fluoride or magnesium fluoride, and phosphates such as aluminum phosphate. It is well known in the art that these materials maintain surface stability. However, when these materials are present on the surface of an active material, electrochemical performance may be deteriorated.

The first coating layer forms the interface between the cathode active material and the electrolyte solution, thus preventing emission of a large amount of oxygen and rapid heat-generation caused by exposure to the electrolyte solution due to abnormal high-temperature of batteries fabricated from the cathode active material or external impact, causing heat-generation, avoiding combustion and explosion of batteries and thus improving high-temperature stability.

When only the non-reactive material which does not react with the electrolyte solution is applied in order to improve stability, battery performance may be disadvantageously deteriorated due to increased resistance of electrodes.

Accordingly, in order to improve rate characteristics as well as high-temperature stability, the second coating layer composed of a carbon-based material is applied to the first coating layer. The carbon-based material applied to the surface of the cathode active material improves electrical conductivity and ionic conductivity and thus increases rate characteristics.

Examples of applicable carbon-based materials include: graphite such as natural graphite or artificial graphite; carbon blacks such as acetylene black, ketjen black, channel black, furnace black, lamp black or thermal black; and carbon fibers. The carbon-based material may be used alone or as a combination thereof.

Preferably, the non-reactive material or the carbon-based material has a mean diameter (D50) of 50% or less of lithium nickel oxide.

Specifically, the non-reactive material and the carbon-based material are applied to the surface of the lithium nickel composite oxide. When the diameter of the non-reactive material and the carbon-based material is excessively small, dispersibility is deteriorated due to coagulation of particles, thus making uniform application difficult. On the other hand, when the diameter of the non-reactive material exceeds 50% of the mean diameter (D50) of the lithium nickel oxide, application of the non-reactive material to the surface of the lithium nickel oxide is difficult due to large interface area thereof. More preferably, the mean diameter is 10% to 50%.

In addition, when the first coating layer is excessively thick, deterioration in ionic conductivity and an increase in internal resistance disadvantageously occur. On the other hand, when the first coating layer is excessively thin, high-temperature stability cannot be sufficiently exerted. In addition, as the second coating layer of the carbon-based material becomes thicker, conductivity improves, but the second coating layer has a thickness exceeding a predetermined level, a further increase of conductivity is not observed.

The bonding of the first coating layer or second coating layer with the surface of lithium nickel oxide or the bonding between these coating layers may be achieved via chemical bonding, caused by applying materials for these layers. In view of processibility and stability of lithium nickel oxide, the bonding may be physical bonding.

Physical bonding means that these layers contact via reversible bonding causing no variation in chemical properties, such as van der Waals attraction or electrostatic attraction, rather than chemical bonding such as ionic bonding or covalent bonding.

For example, the physical bonding may be readily carried out by fusion using a means such as mechano-fusion or Nobilta systems. Mechano-fusion is a method for forming a mixture via physical rotational force in a dry state, which induces electrostatic binding capacity between components.

In addition, when the content of the non-reactive material is excessively high, internal resistance increases, making improvement in electrical conductivity and ionic conductivity caused by application of a carbon-based material difficult, and on the other hand, when the content is excessively low, sufficient high-temperature stability cannot be exerted. In addition, as the content of the carbon-based material increases, conductivity may be improved, but application area of the non-reactive material decreases. As a result, improvement in high-temperature stability cannot be obtained. Accordingly, the ratio of applied non-reactive material and carbon-based material is preferably 90:10 to 10:90 (wt %).

In order to accomplish these effects of the present invention, formation of the coating layer does not necessarily require complete coating of lithium nickel oxide.

When the application area of the coating layer is excessively large, mobility of lithium ions is deteriorated and rate characteristics may be decreased. On the other hand, when the application area is excessively small, the desired effects cannot be exerted. Accordingly, the non-reactive material and the carbon-based material are applied in an area of 20 to 80% of the total surface area of lithium nickel oxide.

In addition, when the application amount is excessively small, effects resulting from application cannot be achieved. On the other hand, when the application amount is excessively large, battery performance may be deteriorated. Accordingly, it is preferred that the application amount is within the range of 0.5 to 10%, based on the total weight of the active material.

The present invention provides a lithium secondary battery comprising the cathode active material. The lithium secondary battery generally comprises a cathode, an anode, a separator, and a lithium salt-containing non-aqueous electrolyte.

For example, the cathode may be prepared by applying a cathode mix comprising a cathode active material, a conductive material, a binder and a filler to a cathode current collector, followed by drying. The cathode mix may comprise a filler, if necessary.

As examples of the anode active material that can be used in the present invention, mention may be made of carbon and graphite materials such as natural graphite, artificial graphite, expanded graphite, carbon fibers, non-graphitizing carbon, carbon black, carbon nanotubes, fullerenes and activated carbon; metals such as Al, Si, Sn, Ag, Bi, Mg, Zn, In, Ge, Pb, Pd, Pt and Ti, which are alloyable with a lithium metal, and compounds containing such elements; a composite material of a metal or metal compound and a carbon or graphite material; and a lithium-containing nitride.

Among these, more preferred are the carbon-, silicon-, tin-, silicon/carbon-based active materials, which may be used alone or in any combination thereof.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

Alternatively, the separator may be an organic/inorganic composite porous separator comprising an active layer in which one or more regions selected from the group consisting of polyolefin-based separator materials, the surface of the materials and porous parts present in the materials are coated with a mixture of inorganic particles and a polymer. In some cases, the inorganic particles may be coated on an electrode.

These inorganic particles may be selected from piezoelectric inorganic particles having a dielectric constant of 5 or higher and inorganic particles having lithium ion transfer capacity.

Examples of the binder include polyvinylidene, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene propylene diene terpolymer (EPDM), sulfonated EPDM, styrene butadiene rubber, fluoro rubber and various copolymers and polymer-saponified polyvinyl alcohol.

The conductive material is commonly added in an amount of 1 to 20% by weight, based on the total weight of the mixture including the cathode active material. Any conductive material may be used without particular limitation so long as it has suitable conductivity without causing adverse chemical changes in the fabricated secondary battery. As examples of the conductive materials that can be used in the present invention, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The viscosity controlling agent is an ingredient to control the viscosity of the electrode mix and thereby enable easy mixing of the electrode mix and application thereof to a current collector, and is added in an amount of 30 wt % or less, based on the total weight of the electrode mix. Examples of viscosity controlling agents include, but are not limited to, carboxymethyl cellulose and polyvinylidene fluoride. In some cases, the afore-mentioned solvent may act as the viscosity controlling agent.

The filler is an auxiliary ingredient used to inhibit expansion of the electrode. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

The coupling agent is an auxiliary ingredient to improve adhesion between electrode active materials and the binder, has two or more functional groups, and may be used in an amount of 30% by weight, based on the weight of the binder. For example, the coupling agent may be a material which has one functional group which reacts with a hydroxyl group or a carboxyl group present on the surface of silicon-, tin-, graphite-based active materials to form a chemical bond and other functional groups which react with a polymeric binder to form a chemical bond. Specifically, examples of coupling agents include, but are not limited to, silane-based compounds such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane, and cyanatopropyl triethoxysilane.

The adhesion promoter is an auxiliary ingredient to improve adhesion of an active material to a current collector, is present in an amount of 10 wt %, based on the binder and examples thereof include oxalic acid, adipic acid, formic acid, acrylic acid derivatives and itaconic acid derivatives.

Examples of molecular weight controllers that can be used in the present invention include t-dodecyl mercaptan, n-dodecyl mercaptan and n-octylmercaptan. Examples of cross-linking agents include 1,3-butanediol diacrylate, 1,3-butanediol dimethacrylate, 1,4-butanediol diacrylate, 1,4-butanediol dimethacrylate, aryl acrylate, aryl methacrylate, trimethylolpropane triacrylate, tetraethylene glycol diacrylate, tetraethylene glycol dimethacrylate and divinylbenzene.

The current collector is a site where electrons are transferred during electrochemical reactions of active materials. Depending on the type of the electrode, the current collector is divided into an anode current collector and a cathode current collector.

The anode current collector is generally fabricated to have a thickness of 3 to 500 μm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel surface-treated with carbon, nickel, titanium or silver, and aluminum-cadmium alloys.

The cathode current collector is generally fabricated to have a thickness of 3 to 500 μm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel surface-treated with carbon, nickel, titanium, silver or the like.

If necessary, these current collectors may also be processed to form fine irregularities on the surface thereof so as to enhance adhesion to the cathode active materials. In addition, the current collectors may be used in various forms including films, sheets, foils, nets, porous structures, foams and nonwoven fabrics.

The electrolyte solution consists of a non-aqueous electrolyte and a lithium salt. The lithium salt serves as a lithium ion source in batteries, enables basic operations of lithium batteries and promotes transfer of lithium ions between a cathode and an anode. Examples of lithium salts include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenyl borate and imides.

The non-aqueous organic solvent serves as a medium, allowing ions involved in electrochemical reactions of batteries to be transferred. Examples of non-aqueous solvents include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate. When the organic solvent is used in a combination thereof, the mix ratio may be suitably controlled according to the desired battery performance, which is well-known to those skilled in the art.

The organic solvent may serve as a dispersion medium used for cathode fabrication. Examples of organic solvents include, but are not limited to, water; alcohols, e.g., methanol, ethanol, propanol, isopropyl alcohol, butanol, iso-butanol, s-butanol, t-butanol, pentanol, iso-pentanol or hexanol; ketones, e.g., acetone, methyl ethyl ketone, methyl propyl ketone, ethyl propyl ketone, cyclopentanone, cyclohexanone, cycloheptanone; ethers such as methylethylether, diethylether, dipropylether, diisopropylether, dibutylether, diisobutylether, diisoamylether, methylpropylether, methylisopropylether, methylbutylether, ethylpropylether, ethylisobutylether, ethyl-n-amylether, ethyl-iso-amylether or tetrahydrofuran; lactones such as gamma-butyrolactone or delta-butyrolactone; lactams such as beta-lactam; cyclic aliphatics such as cyclopentane, cyclohexane or cycloheptane; aromatic hydrocarbons such as benzene, toluene, o-xylene, m-xylene, p-xylene, ethylbenzene, propylbenzene, isopropylbenzene, butylbenzene, isobutylbenzene, n-amylbenzene; straight or cyclic amides such as aliphatic hydrocarbons such as heptane, octane, nonane or decane; dimethylformamide or N-methylpyrrolidone; esters such as methyl lactate, ethyl lactate, propyl lactate, butyl lactate, or methyl benzoate; and the following liquids constituting the solvent of the electrolyte solution. The dispersion medium may be used in a combination of two or five species.

The lithium secondary batteries of the present invention may be fabricated by a conventional method known in the art. Also, the shape of the cathode, anode and separator structures of the lithium secondary batteries is not particularly limited and, for example, respective sheets are inserted into a cylindrical, square or pouch case in a winding- or stacking-type.

The lithium secondary batteries of the present invention may be used for various devices requiring superior rate characteristics and high-temperature stability. Examples of such devices include, but are not limited thereto, power tools driven by battery-powered motors; electric vehicles (EVs) including hybrid electric vehicles (HEVs) and plug-in hybrid electric vehicles (PHEVs); electric two-wheeled vehicles including E-bikes and E-scooters; and electric golf carts.

Advantageous Effects

As apparent from the fore-going, the present invention provides a cathode active material incorporated into lithium secondary batteries that can exert superior high-temperature stability and high capacity without deteriorating battery performance.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following Examples. These examples are provided only for illustrating the present invention and should not be construed as limiting the scope and spirit of the present invention.

Example 1

$LiNi_{0.53}Mn_{0.27}Co_{0.20}O_2$ (A) was treated with a dispersion of aluminum isopropoxide in anhydrous alcohol and heated in an electric furnace at 400° C. to prepare a cathode active material (B) containing about 1 wt % of $Al_2O_3$. The $Al_2O_3$— containing active material (B) thus obtained and carbon were added to the cathode active material (B) in a ratio of 100:2, and the resulting mixture was treated in a dry coating system at 2.5 kW and 3000 rpm for 5 minutes to obtain a cathode active material (C).

Example 2

The cathode active material was treated in the same manner as in Example 1, except that the active material (B) and carbon were added in a weight ratio of 100:1.

Example 3

The cathode active material was treated in the same manner as in Example 1, except that $LiNi_{0.5}Mn_{0.3}Co_{0.2}O_2$ was added, as the active material (A), instead of $LiNi_{0.53}Mn_{0.27}Co_{0.20}O_2$.

Comparative Example 1

The active material (A) used for Example 1 was prepared without separate treatment.

Comparative Example 2

The active material (B) used for Example 1 was prepared without separate treatment.

Experimental Example 1

Figure 1:
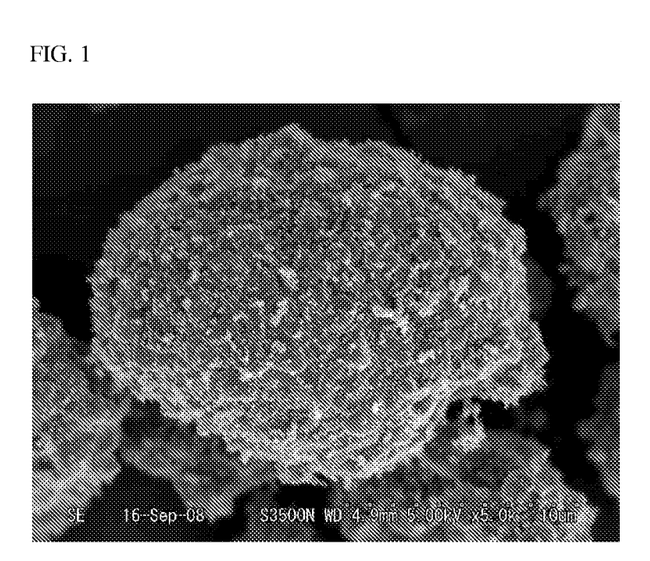
FIG. 1 is an SEM image of the cathode active material obtained in Example 1.
Figure 2:
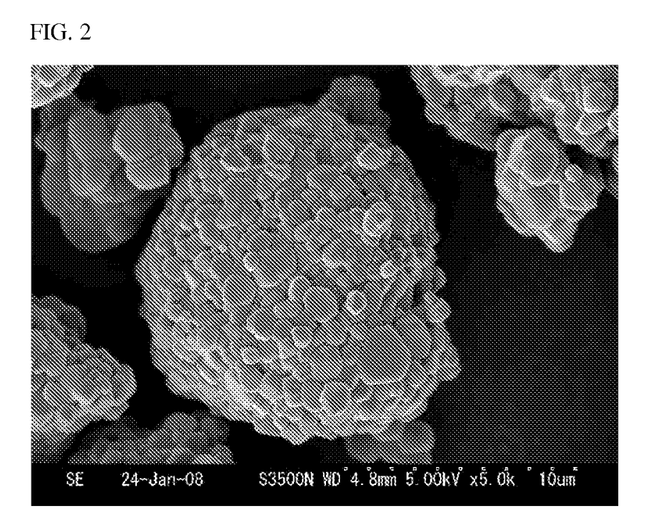
FIG. 2 is an SEM image of the cathode active material obtained in Comparative Example 1.
Figure 3:
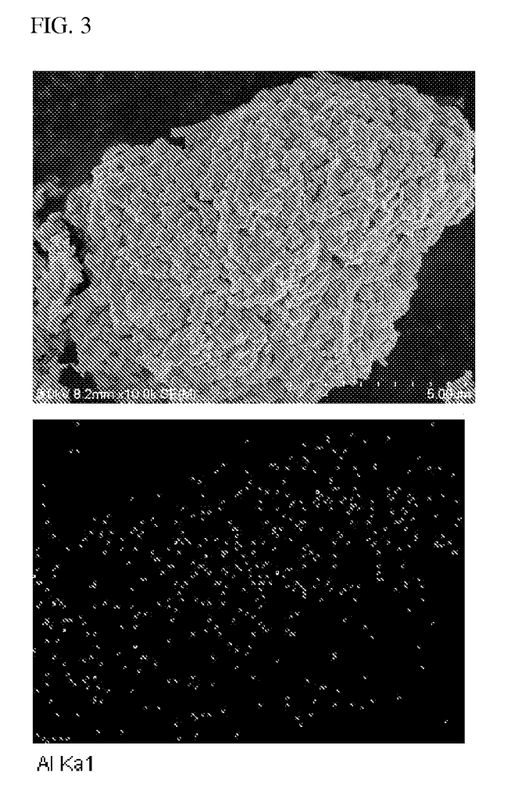
FIG. 3 is an SEM image of the cathode active material obtained in Comparative Example 2.
Figure 4:
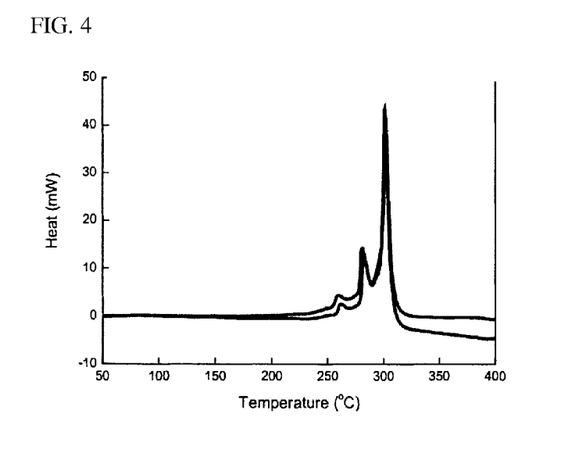
FIG. 4 is a graph showing heat-emission positions and intensities through DSC for the battery fabricated from the cathode active material obtained in Comparative Example 1 after charging at 0.1 C up to 4.3V.
Figure 5:
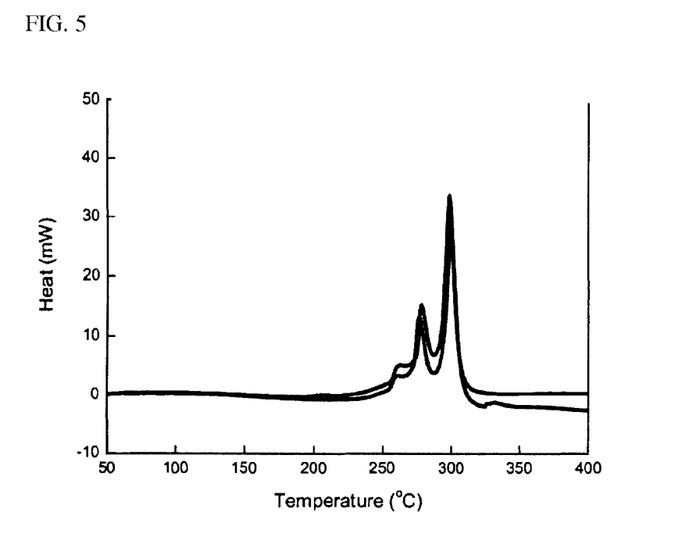
FIG. 5 is a graph showing heat-emission positions and intensities through DSC for the battery fabricated from the cathode active material obtained in Comparative Example 2 after charging at 0.1 C up to 4.3V.
Figure 6:
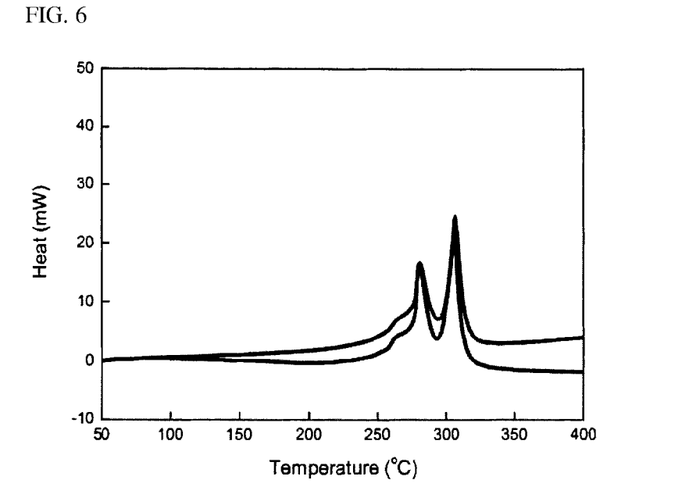
FIG. 6 is a graph showing heat-emission positions and intensities through DSC for the battery fabricated from the cathode active material obtained in Example 1 after charging at 0.1 C up to 4.3V.
Figure 7:
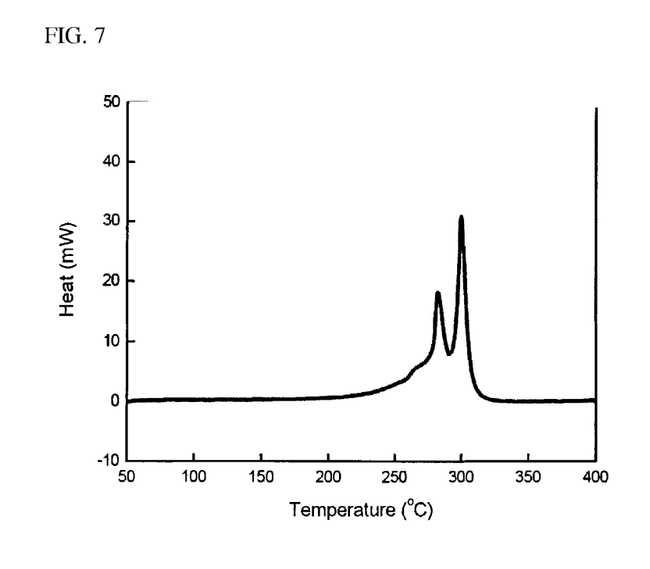
FIG. 7 is a graph showing heat-emission positions and intensities through DSC for the battery fabricated from the cathode active material obtained in Example 2 after charging at 0.1 C up to 4.3V.
Figure 8:
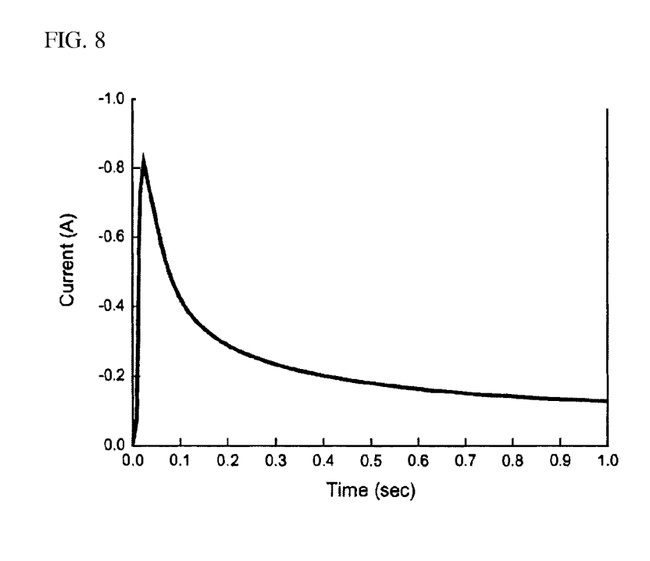
FIG. 8 is a graph showing SCC results of the battery fabricated from the cathode active material obtained in Comparative Example 1.
Figure 9:
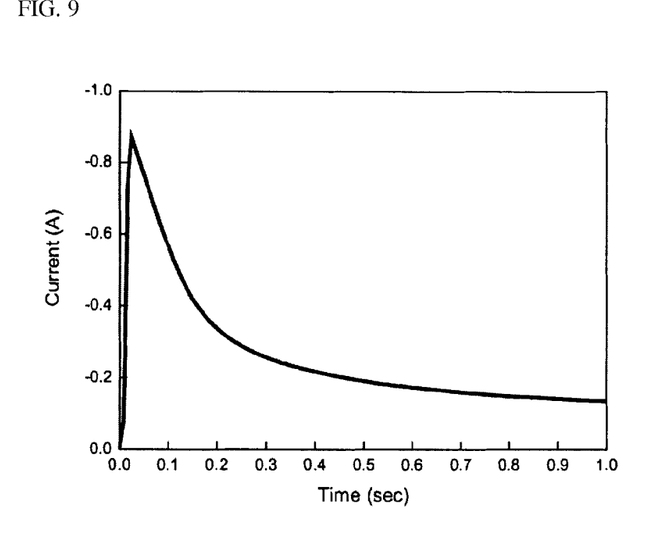
FIG. 9 is a graph showing SCC results of the battery fabricated from the cathode active material obtained in Comparative Example 2.
Figure 10:
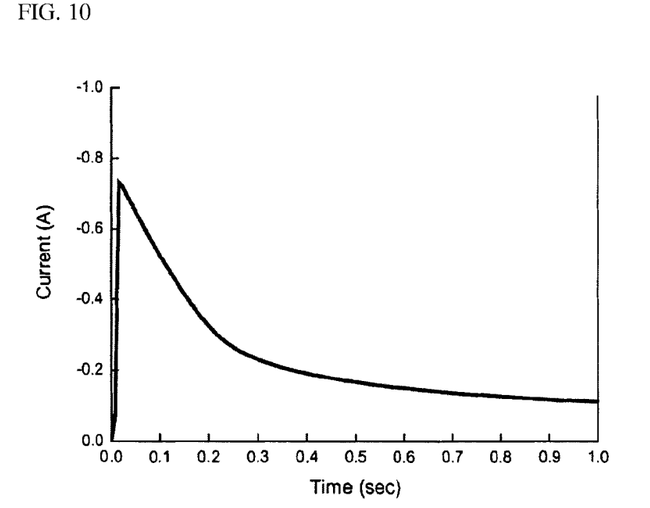
FIG. 10 is a graph showing SCC results of the battery fabricated from the cathode active material obtained in Example 1.
Figure 11:
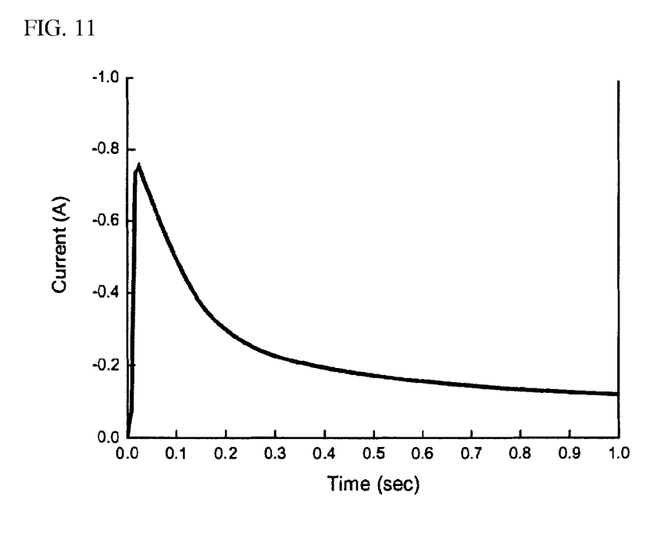
FIG. 11 is a graph showing SCC results of the battery fabricated from the cathode active material obtained in Example 2.

The active materials obtained in Example 1 and Comparative Examples 1 and 2 were subjected to surface-observation using a scanning electron microscope. The results of Example 1, Comparative Example 1 and Comparative Example 2 are shown in FIGS. 1, 2 and 3, respectively. As can be seen from FIG. 3, the cathode active material (B) containing about 1 wt % of $Al_2O_3$ obtained by treatment with a dispersion of aluminum isopropoxide in anhydrous alcohol and heating in an electric furnace at 400° C. was subjected to EDS to perform surface-observation. The results indicated that aluminum (Al) was homogeneously dispersed in the surface of the active material.

Experimental Example 2

The active material obtained in Examples 1 to 3 and Comparative Examples 1 to 2, a conductive material and a binder were added in a ratio of 95:2.5:2.5 to prepare a slurry and the slurry was applied to an Al-foil to obtain electrodes. The electrodes thus obtained were subjected to blanking such that a pore ratio is 25% to fabricate a coin cell. Li was used as an anode and a solution of 1M $LiPF_6$ in carbonate solvent was used as an electrolyte solution. The cell thus obtained was subjected to charge/discharge in the range of 3V to 4.25V at 0.1 C to measure capacity and efficiency. The results of Examples 1 to 2 and Comparative Examples 1 to 2 are shown in Table 1 below:

TABLE 1

|  | $1^{st}$ charge (mAh/g) | $1^{st}$ discharge (mAh/g) | $1^{st}$ efficiency (%) |
|---|---|---|---|
| Comp. Ex. 1 | 184.3 | 162.1 | 87.9 |
| Comp. Ex. 2 | 184.5 | 161.2 | 87.4 |
| Ex. 1 | 185.0 | 162.7 | 87.9 |
| Ex. 2 | 184.7 | 161.8 | 87.6 |

As can be seen From Table 1 above, slight deterioration in electrochemical performance upon treatment of only Al was improved by carbon treatment. The active material of Example 3 exhibited similar results.

Experimental Example 3

The cells fabricated from the active materials obtained in Experimental Example 2 were charged at 0.1 C to 4.3V and heat-emission positions and intensities thereof were measured using a differential scanning calorimeter (DSC). The results of Comparative Example 1, Comparative Example 2, Example 1 and Example 2 are shown in FIGS. 4, 5, 6 and 7, respectively.

As a result of experiments, Comparative Example 2 exhibited a decrease in heat-emission intensity via Al treatment, as compared to Comparative Example 1. In addition, Example 1 treated with both Al and carbon exhibited a greater decrease in heat-emission intensity, as compared to Comparative Example 2. Example 3 exhibited substantially similar results to Example 1. This indicates that stability of the active material is improved.

Experimental Example 4

The short-circuit current (SCC) of the cells fabricated from the active materials obtained in Experimental Example 2 were measured. The results of Comparative Example 1, Comparative Example 2, Example 1 and Example 2 are shown in FIGS. 8, 9, 10 and 11, respectively.

As a result of experiments, Comparative Example 2 exhibited broader current peaks due to Al treatment, as compared to Comparative Example 1. In this experiment, variations in current peak intensity were not observed. However, in practice, when short occurs, current at which time is close to zero cannot be considered peak current due to limited measurement capacity of apparatuses. When the gradient of the current profile thus obtained is broad, that is, when peak broadening occurs, current at a limit of time=0 is considered to be lower. In addition, Example 1 treated with both Al and carbon exhibited decreased current peak intensity, as compared to Comparative Example 2. As the amount of carbon contained in the active material increases, current peak intensities decrease. Example 3 exhibited substantially similar results to Example 1. This means that stability of the active material is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode comprising:
    a cathode current collector; and
    a cathode mix applied to a surface of said cathode current collector comprising cathode active material particles, a conductive material and a binder,
    wherein the cathode active material particles comprise a lithium nickel-manganese-cobalt oxide represented by the following Formula (1a), a first coating layer present on a surface of the cathode active material particle, and a second coating layer on a surface of the first coating layer,
    wherein the lithium nickel oxide contains nickel in an amount of 40% or higher, based on the total weight of transition metals, wherein the first coating layer comprises a non-reactive material which is at least one oxide, and the second coating layer comprises a carbon-based material selected from the group consisting of graphite such as natural graphite or artificial graphite, carbon blacks such as acetylene black, ketjen black, channel black, furnace black, lamp black or thermal black and carbon fibers, wherein a bonding between the first coating layer or the second coating layer and a surface of lithium nickel oxide is a physical bonding, or a bonding between the first and second coating layers is a physical bonding, and wherein the cathode active material particle comprises a secondary particle having an average diameter of 3 to 20 μm in the form of an aggregate of primary particles having an average diameter of 0.01 to 8 μm, wherein the cathode active material is represented by Formula 1a (1a)

wherein $0.95 \leq x \leq 1.15$, $0.40 \leq y \leq 0.9$, ($y+c+d=1$ in which $0.05 \leq c \leq 0.3$, $0.1 \leq d \leq 0.2$) and wherein the first coated layer is $Al_2O_3$ and the second coated layer is said carbon based material, and wherein the first coating layer and/or the second coating layer are applied in an area of 20 to 80% of the total surface area of lithium nickel oxide represented by Formula 1a.

2. The cathode according to claim 1, wherein the ratio of the non-reactive material to the carbon-based material is 90:10 to 10:90 (wt %).

3. The cathode according to claim 1, wherein the application amount is within the range of 0.5 to 10%, based on the total weight of the active material.

4. A lithium secondary battery comprising the cathode according to claim 1.

5. The cathode according to claim 1, wherein M is at least one selected from the group consisting of Mn, Co, Mg and Al.

6. The cathode according to claim 1, wherein the non-reactive material is at least one oxide selected from the group consisting of aluminum oxide, magnesium oxide and zirconium oxide.

* * * * *